United States Patent [19]

Kenny et al.

[11] Patent Number: 4,644,440
[45] Date of Patent: Feb. 17, 1987

[54] REDUNDANT POWER SUPPLY ARRANGEMENT WITH SURGE PROTECTION

[75] Inventors: Thomas J. Kenny, Pittsburgh; James F. Sutherland, Plum, both of Pa.

[73] Assignee: Westinghouse Electric Corp., Pittsburgh, Pa.

[21] Appl. No.: 689,691

[22] Filed: Jan. 8, 1985

[51] Int. Cl.⁴ .................................................. H02H 3/20
[52] U.S. Cl. ........................................ 361/111; 361/91; 307/75; 307/64
[58] Field of Search ............... 361/86, 88, 91, 111; 307/64, 75, 80, 84; 320/7, 16

[56] References Cited

U.S. PATENT DOCUMENTS

| | | | |
|---|---|---|---|
| 1,756,589 | 4/1930 | Gilson | 307/64 |
| 1,860,099 | 5/1932 | James | 307/64 |
| 2,861,239 | 11/1958 | Gilbert | 223/19 |
| 2,881,382 | 4/1959 | Amato | 321/16 |
| 3,037,129 | 5/1962 | Le Bel | 307/88.5 |
| 3,188,554 | 6/1965 | Reid | 323/74 |
| 3,426,263 | 2/1969 | Hennigen et al. | 320/23 |
| 3,428,820 | 2/1969 | Lyon | 307/64 |
| 3,493,777 | 2/1970 | Richards | 307/80 |
| 3,527,985 | 9/1970 | Brown | 317/16 |
| 3,878,434 | 4/1975 | Voorhoeve | 317/16 |
| 3,922,559 | 12/1975 | Migeon | 307/64 |
| 4,068,279 | 1/1978 | Byrnes | 361/56 |
| 4,173,774 | 11/1979 | Hyvarinen et al. | 361/87 |
| 4,227,257 | 10/1980 | Sato | 307/64 |
| 4,282,555 | 8/1981 | Svedberg | 361/56 |
| 4,302,791 | 12/1981 | Buchanan et al. | 361/86 |
| 4,390,919 | 6/1983 | Lesinski | 361/56 |
| 4,455,586 | 6/1984 | McCartney | 361/56 |

OTHER PUBLICATIONS

MCG Electronics Inc., "Circuit Protectors", 1974, pp. 3-5, 10-11.

Primary Examiner—A. D. Pellinen
Assistant Examiner—A. Jonathan Wysocki
Attorney, Agent, or Firm—Daniel C. Abeles

[57] ABSTRACT

A redundant d.c. power supply arrangement for supplying power to a load circuit, wherein the power supply arrangement is subjected to voltage transients of high frequency and magnitude which emanate from the load circuit. The arrangement includes first and second power supply branches connected in electrical parallel with the load circuit. Each power supply branch includes a d.c. voltage supply and a Zener diode connected in electrical series with the voltage supply. The Zener diodes are selected and arranged for causing at least one of the voltage supplies to deliver power to the load circuit. Each Zener diode has a reverse breakdown voltage for clamping a voltage transient emanating from the load circuit to that Zener breakdown voltage and provides a low impedance path for a resulting current surge associated with the voltage transient.

5 Claims, 1 Drawing Figure

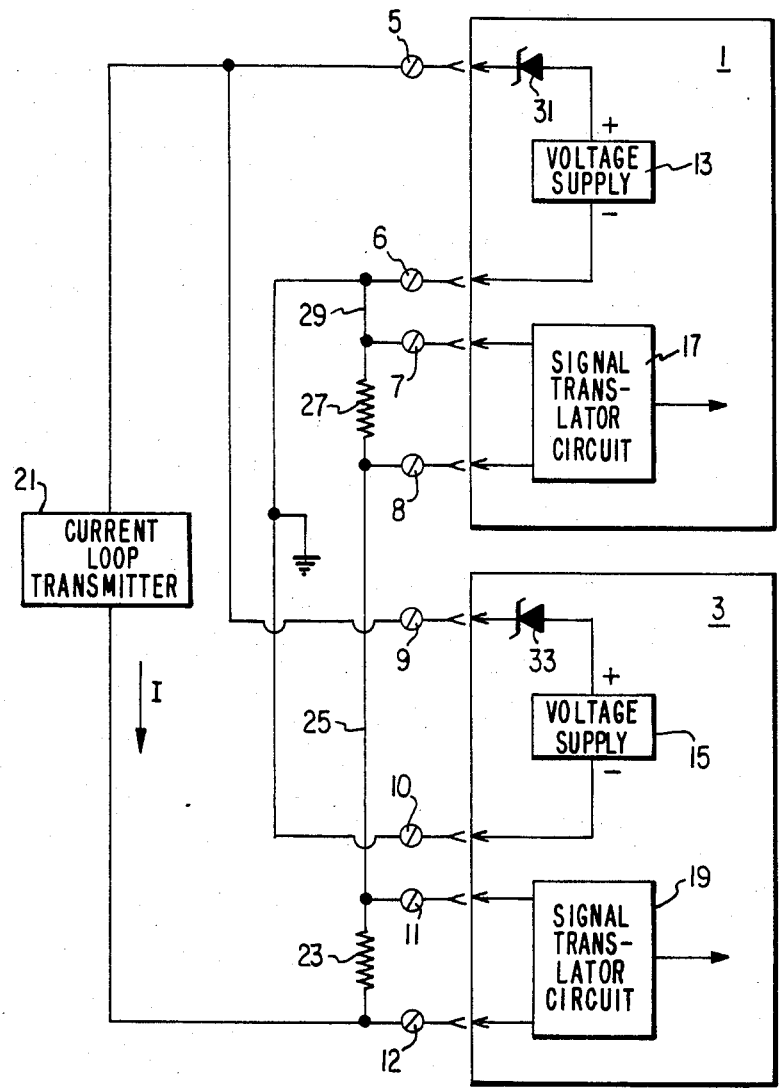

REDUNDANT POWER SUPPLY ARRANGEMENT WITH SURGE PROTECTION

BACKGROUND OF THE INVENTION

1. Field of the Invention

This invention relates generally to a redundant d.c. power supply arrangement for supplying power to a load circuit and means for protecting the power supply arrangement from voltage transients of high frequency and magnitude which emanate from the load circuit.

2. Background of the Prior Art

It is known to connect redundant d.c. power supplies in electrical parallel for supplying power to a single load. Since the voltages of the power supplies are generally not identical, it is known to place an auctioneering diode in series with each power supply. In such an arrangement the diode associated with the power supply having the highest voltage magnitude will be forward biased, connecting its power supply to the load. The diode associated with the power supply having the lower voltage magnitude will be back biased by the higher voltage magnitude of the other voltage supply, effectively taking the power supply of lower voltage magnitude out of the circuit. Such an arrangement also prevents the power supply having the lower voltage magnitude from being short-circuited by the other power supply. If either one of the power supplies is physically removed from the circuit or is otherwise rendered inoperative, the other voltage supply in such a redundant arrangement will supply the power to the load.

A problem arises with this type of redundant voltage supply arrangement when it is used to supply power to a load circuit which has components in it or coupled to it which can generate a voltage transient of high frequency and magnitude in the load circuit. Such a voltage transient would likely burn out the series connected diodes associated with the redundant power supplies, resulting in a disconnection of the power supplies from the load circuit.

SUMMARY OF THE INVENTION

It is an object of the present invention to provide a redundant d.c. power supply arrangement of the above type which avoids the above discussed problem associated with high voltage transients emanating from the load circuit to which the redundant power supplies are connected.

It is a further object of the invention to provide a circuit arrangement including separate plug-in modules each containing processing circuitry operatively associated with the load circuit and a dedicated power supply for supplying power to the load circuit, wherein any one module may be disconnected from the load circuit without affecting the operation of the load circuit in relation to the remaining modules.

The above and other objects are accomplished in accordance with the invention wherein a redundant d.c. power supply arrangement is provided for supplying power to a load circuit, the power supply arrangement being subjected to voltage transients of high frequency and magnitude which emanate from the load circuit, including first and second power supply branches connected in electrical parallel with the load circuit, each power supply branch including a d.c. voltage supply and a Zener diode connected in electrical series with the voltage supply. The Zener diodes are selected and arranged for causing at least one of the voltage supplies to deliver power to the load circuit. Further, each Zener diode has a reverse breakdown voltage for clamping a voltage transient emanating from the load circuit to the Zener breakdown voltage and provides a low impedance path for a current surge associated with the voltage transient.

The arrangement according to the invention thus utilizes the Zener diodes in the conventional manner in which regular diodes are utilized to auction power between redundant, parallel connected power supplies. The Zener diodes serve the additional purpose, however, of protecting each power supply circuit against voltage surges of high magnitude and frequency which would otherwise destroy a regular diode. Preferably, the series connected Zener diodes are of the type which have a high current carrying capability in the reverse direction and which thus are able to withstand the peak pulse power contained in the voltage surge. Such a Zener diode is able to survive a high voltage transient, passing the associated current surge to the power supply which normally has its own protection circuitry to avoid the effects of the current surge.

In a further aspect of the invention the redundant power supply arrangement is employed in connection with plug-in modules wherein each module has signal processing circuitry operatively associated with the load circuit and its own dedicated power supply. According to this aspect of the invention any one module may be disconnected from the load circuit, for example for servicing, without cutting off power to the load or otherwise affecting the operation of the other load circuit in relation to the processing circuitry on the remaining modules.

BRIEF DESCRIPTION OF THE DRAWINGS

The sole FIGURE in the drawing is a circuit schematic in partial block circuit diagram form which illustrates a redundant power supply arrangement in accordance with the invention.

DESCRIPTION OF THE PREFERRED EMBODIMENT

A redundant power supply arrangement according to the invention is illustrated in the drawing in the context of a particular application relating to a current loop transmitter which produces a current corresponding to a value for a measured parameter. In this application the current is used to energize respective reference resistors to produce a voltage which is processed by circuitry contained on respective plug-in analog input modules as discussed below. The description of the redundant power supply arrangement of the invention in the context of this particular application is not intended to limit the use of the invention to any other application. To the contrary, the redundant power supply arrangement according to the invention can be used whenever it is desired to have redundant power supplies driving a load which is contained in a circuit which can present voltage transients of high frequency and magnitude that must be accommodated by the power supply arrangement.

Referring to the FIGURE, a plug-in module 1 and a plug-in module 3 are connected via conventional male and female elements indicated by the respective arrows to screw terminals 5 to 12. Plug-in modules 1 and 3, which may be conventional circuit boards, each support a respective voltage supply 13, 15 and a respective buffer and signal translator circuit 17, 19.

Screw terminals 5, 6, 9 and 10 are connected so that when the male elements of plug-in modules 1 and 3 are engaged with the female elements associated with the screw terminals, the voltage supplies 13 and 15 are connected in electrical parallel for driving a current loop transmitter 21 which is connected across screw terminals 5 and 12. Screw terminal 12 is connected to screw terminal 11 via a first reference resistor 23. Screw terminal 11 is connected by a lead 25 to screw terminal 8 which is in turn connected to screw terminal 7 via a reference resistor 27. Screw terminal 7 is connected by a lead 29 to screw terminal 6 which is connected to ground. Reference resistors 23 and 27 are thus connected in electrical series. The buffer and signal translator circuits 17 and 19 are each connected to a respective one of the reference resistors 27 and 23 for receiving and processing a voltage drop across the associated reference resistor.

In this particular application, the redundant power supply arrangement supplies power to the current loop transmitter 21 which generates a current I whose magnitude corresponds to the value of a process parameter, such as temperature or pressure, which is being monitored, for example for control purposes. The current loop transmitter forms no part of the invention; however it may comprise, for example a transducer which is sensitive to temperature or pressure and which produces a current magnitude corresponding to a given value of the temperature or pressure. The current I produces a voltage across each of the reference resistors 23 and 27. The voltage across each reference resistor 23 and 27 is provided as an input to a respective one of the buffer and signal translators 19 and 17 via the screw terminal pairs 11, 12 and 7, 8, respectively. The buffer and signal translator circuits 17 and 19 isolate any noise and translate the respective voltage magnitudes in a known manner to produce an analog signal which is furnished as an input to respective loop processors (not shown) which form part of a control loop for a process which is being controlled. Neither the buffer and signal translators 17 and 19 nor the particular circuitry used to implement such devices form any part of the present invention. Any signal processing circuitry requiring an operative relationship with the load circuit and which can be removably connected to the load circuit may be mounted on the modules in combination with respective dedicated power supplies within the principles of the invention.

As shown in the FIGURE, voltage supply 13 is connected in series with a Zener diode 31 and voltage supply 15 is connected in series with a Zener diode 33. While the Zener diodes 31 and 33 are shown connected between the positive pole of the respective voltage supplies 13 and 15 and current loop transmitter 21, in some applications it may be possible to connect the Zener diodes in the respective common legs of the power supplies.

If the voltage supplies 13 and 15 were to furnish voltages of identical magnitude, then Zener diodes 31 and 33 would both be forward biased and 50% of the power supplied to current loop transmitter 21 would be furnished by each of the voltage supplies. In practice, however, the voltage supplies 13 and 15 will rarely produce the same voltage and in fact it is desirable to select the voltage supplies 13 and 15 so that their maximum voltage magnitudes differ by a predetermined amount.

When the voltage magnitudes of the voltage supplies 13 and 15 differ, the Zener diode associated with the voltage supply having the lower voltage magnitude will be back biased and thus will not conduct any current. In this sense, the Zener diodes 31 and 33 are utilized to auction power from the redundant power supplies in the same manner that regular diodes have been used to auction power among redundant d.c. voltage supplies. That is, the Zener diode associated with the voltage supply having the higher voltage magnitude will be forward biased and thus will furnish current to the loop transmitter 21, while the other voltage supply will be effectively disconnected from the circuit because its associated Zener diode will be back biased.

In order to assure that the Zener diode associated with the voltage supply having the lower voltage magnitude will be back biased so long as the other voltage supply is connected and furnishing power to the load, it is necessary to select the Zener breakdown voltage of that Zener diode so that it is at least as great as the maximum difference between the voltage magnitudes of the two voltage supplies, less the magnitude of the voltage drop across the forward biased Zener diode associated with the voltage supply having the higher voltage magnitude. For example, if voltage supply 13 has a voltage of 65 volts and voltage supply 15, in a worse case is short circuited and thus is at zero volts, and the forward voltage drop across Zener diode 31 is 0.7 volts, the Zener breakdown voltage of Zener diode 33 should be at least 64.3 volts (65 V-0.7 V-0.0 V).

The Zener diodes 31 and 33 thus operate to auction the power between voltage supplies 13 and 15. If, for example, plug-in module 1 were removed from the circuit, the Zener diode 33 would become forward biased and power would continue to be supplied to current loop transmitter 21 via voltage supply 15. The same result would be obtained if plug-in module 1 were not removed but for some reason voltage supply 13 were rendered inoperative. Similarly, if plug-in module 3 were removed from the circuit, current loop transmitter 21 would continue to be powered by voltage supply 13 contained on plug-in module 1.

In addition to auctioneering the power supplied by voltage supplies 13 and 15, the use of Zener diodes 31 and 33 according to the invention also provides protection against high voltage transients which may be generated in the circuit containing the current loop transmitter. Such voltage transients may be generated in a variety of ways, such as by the switching on and off of nearby motors or generators which are inductively and/or capacitively coupled with the circuit of the loop transmitter. In accordance with the invention, a voltage surge which exceeds the breakdown voltage of either Zener diode 31 or 33 causes the respective Zener diode to momentarily clamp the voltage surge to its reverse breakdown voltage and to provide a low impedance path for the resulting current surge. The current surge is passed on to the respective voltage supply which has its own protection circuitry as is well known for avoiding the effects of such a transient. Accordingly, unlike conventional auctioneering diodes which would likely be destroyed by a voltage transient of high magnitude and frequency, Zener diodes 31 and 33 not only perform the required auctioneering diode function, but also have the ability to survive the maximum voltage surge which can be expected to be produced in the circuit of the current loop transmitter.

Preferably, when the redundant voltage supplies according to the invention are utilized to supply power to a load in a high power environment such as a power plant, the Zener diodes 31 and 33 will be selected so that they can dissipate as much as 1500 watts of peak pulse power in the reverse bias direction. The Trans Zorb type Zener diode manufactured by General Semiconductor Industries, Inc., or other comparable Zener diode would be suitable for this purpose.

It should also be understood that the present invention can be implemented with more than two redundant power supplies connected in parallel, the only stipulation being that each Zener diode connected in series with an associated power supply have a reverse breakdown voltage which exceeds the maximum difference between the voltage magnitude of the associated power supply and the voltage magnitude of the power supply having the highest voltage magnitude, less the forward voltage drop across the Zener diode series connected to the power supply having the highest voltage magnitude.

It will be understood that the above description of the present invention is susceptible to various modifications, changes and adaptations, and the same are intended to be comprehended within the meaning and range of equivalents of the appended claims.

We claim:

1. A redundant d.c. power supply arrangement for supplying power to a load circuit which emits voltage transients of high frequency and magnitude, the power supply arrangement being subjected to such voltage transients and comprising:

at least first and second power supply branches each having terminals arranged for connection of said branches in electrical parallel with a load circuit, each said power supply branch including a d.c. voltage supply and a Zener diode connected in electrical series with said voltage supply, said Zener diodes being selected and arranged for causing at least one of said voltage supplies to deliver power to a load circuit wherein each said Zener diode has a reverse breakdown voltage for clamping a voltage transient emanating from such a load circuit to that reverse breakdown voltage and provides a low impedance path for a resulting current surge associated with the voltage transient.

2. An arrangement according to claim 1, wherein each said voltage supply has a positive pole and each said Zener diode is connected to a respective one of said positive poles.

3. An arrangement according to claim 1, wherein the voltage supply in said first power supply branch supplies a voltage having a higher magnitude than the voltage supplied by the voltage supply in said second power supply branch so that the series connected Zener diode in said first power supply branch is forward biased and the series connected Zener diode in said second power supply branch is reverse biased when said arrangement is connected to a load circuit, and wherein the series connected Zener diode in said second power supply branch has a reverse breakdown voltage magnitude which is greater than the maximum difference between the magnitudes of the voltages supplied by the voltage supplies of said first and second power supply branches, less the magnitude of the forward voltage drop across the series connected Zener diode in said first power supply branch.

4. An arrangement according to claim 1, and further comprising first and second modules each for supporting a respective one of said first and second power supply branches, wherein said modules are removably connectable to a load circuit.

5. A circuit arrangement including the power supply arrangement according to claim 4, wherein said circuit arrangement further comprises a plurality of circuit means each supported by a respective one of said modules and being operatively connectable with a load circuit for receiving and processing an electrical signal produced by such a load circuit.

* * * * *